No. 743,874. PATENTED NOV. 10, 1903.
R. J. HOTCHKISS.
HAMES AND HORSE COLLAR.
APPLICATION FILED FEB. 9, 1903.
NO MODEL.
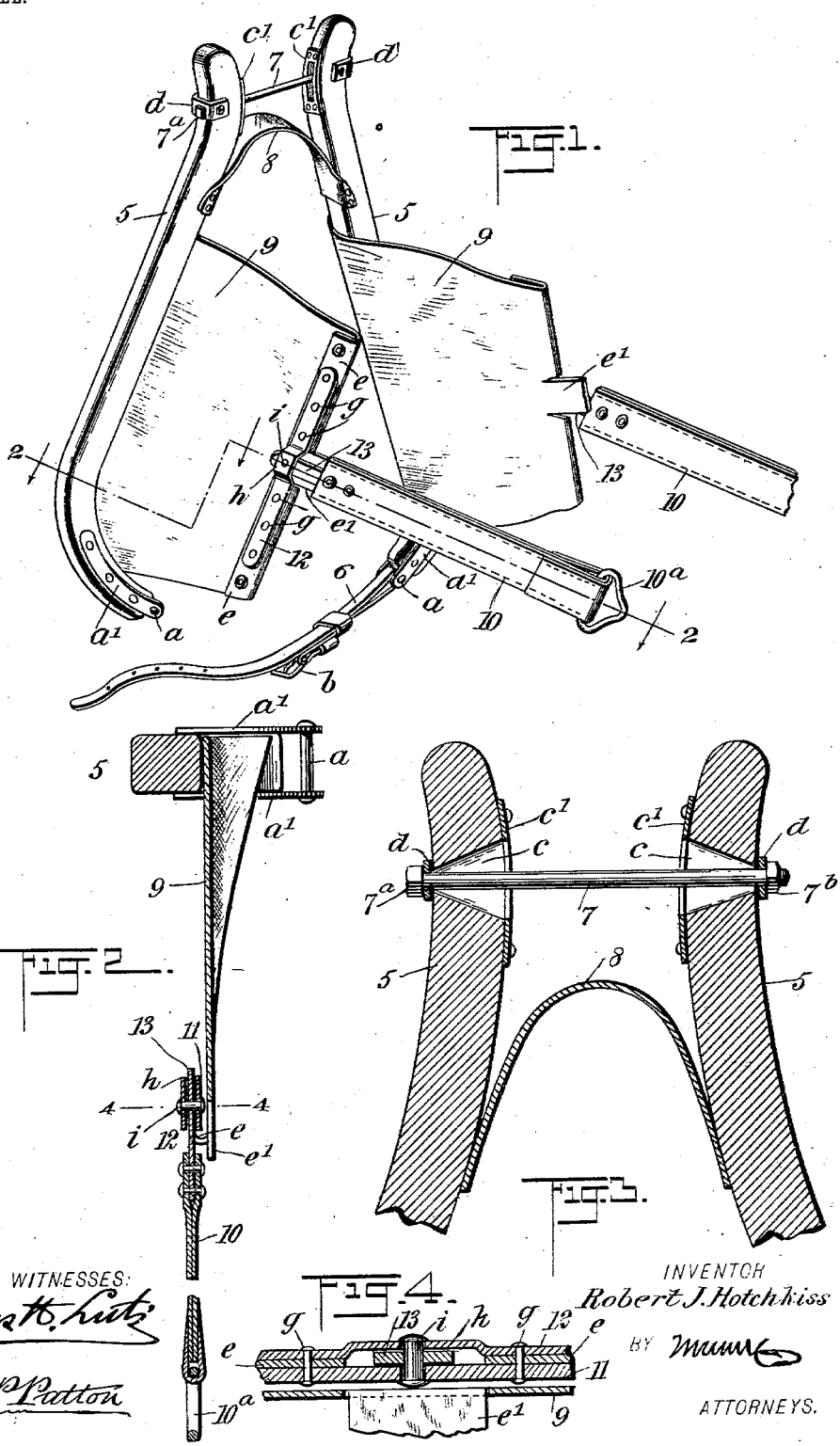
WITNESSES:
Julius H. Lutz
Wm. P. Patton
INVENTOR
Robert J. Hotchkiss
BY Munn
ATTORNEYS.
THE NORRIS PETERS CO., PHOTO-LITHO., WASHINGTON, D. C.

No. 743,874. Patented November 10, 1903.

UNITED STATES PATENT OFFICE.

ROBERT J. HOTCHKISS, OF PEPACTON, NEW YORK, ASSIGNOR TO FLORENCE E. HOTCHKISS, OF PEPACTON, NEW YORK.

HAMES AND HORSE-COLLAR.

SPECIFICATION forming part of Letters Patent No. 743,874, dated November 10, 1903.

Application filed February 9, 1903. Serial No. 142,491. (No model.)

*To all whom it may concern:*

Be it known that I, ROBERT J. HOTCHKISS, a citizen of the United States, and a resident of Pepacton, in the county of Delaware and State of New York, have invented a new and Improved Hames and Horse-Collar, of which the following is a full, clear, and exact description.

The object of this invention is to provide a horse-collar of improved construction which will distribute the draft strain it sustains over a considerable area of the breast and shoulders of the animal wearing the collar, so as to enable the animal to draw a heavy load without galling the shoulders, a further object being to so combine a pair of hames with the novel collar that the hames will afford support thereto by holding the parts of the collar in proper relative positions to receive the strain of pulling a load without imposing such strain upon the hames.

The invention consists in the novel construction and combination of parts, as is hereinafter described, and defined in the appended claim.

Reference is to be had to the accompanying drawings, forming a part of this specification, in which similar characters of reference indicate corresponding parts in all the figures.

Figure 1 is a perspective view of the improvement. Fig. 2 is a sectional plan view of one-half of the device, taken substantially on the line 2 2 of Fig. 1. Fig. 3 is an enlarged vertical sectional view of the upper portion of the hames employed and of a pliable yoke attached thereto, and Fig. 4 is an enlarged transverse sectional view substantially on the line 4 4 in Fig. 2.

The hames 5 comprise two preferably wooden bars, each curved inward at the lower end—that is to say, in a direction toward each other when arranged for use—and at their upper ends the pair of hames are bent outwardly, as shown in Figs. 1 and 3. A throat-strap 6 is provided to effect an adjustable connection of the lower ends of the hames 5, said strap being doubled at a suitable distance from each end, and in the loops thus formed cross-bars $a$ on clip-plates $a'$ are held, said clip-plates being clamped upon the lower ends of the hames, as shown in Figs. 1 and 2, the strap 6 having a buckle $b$ on one end to permit it to be adjusted for length after it has been engaged with both of the hames.

Near their upper ends the hames 5 are transversely and oppositely perforated, said perforations $c$ being longitudinally enlarged toward their inner ends, thus affording inwardly-flaring slots, which are each protected at their inner edges by slotted border-plates $c'$, secured in place by any suitable means. The opposite openings $c$ receive the connecting-bolt 7, whereon washers $d$ in the form of looped clip-plates are mounted, one washer bearing upon one hame 5 under the bolt-head $7^a$, the other washer $d$, that contacts with the remaining hame 5 at the threaded end of the bolt, receiving the impinge of a nut $7^b$, which is screwed upon the thread of the bolt, as shown in Fig. 3.

A piece of leather or other pliable material 8 is secured by its ends, respectively, upon the inner edges and sides of the hames 5 a short distance below the connecting-bolt 7, and said material is upwardly arched to rest upon and conform with the upper portion of the neck of a horse, thus providing a yielding yoke connection between the upper portions of the hames.

The improved breast and shoulder engaging collar consists of two similar quadrangular pieces 9 of leather or other suitable material, such as strong canvas. Each piece or section 9 is firmly secured at and near one edge upon the surface of a respective hame 5, and at said edge the collar-section is so proportioned in width as to adapt it to extend from below and near the yoke 8 to a point near the lower end of the hame to which it is attached, and it will be seen in Fig. 2 that the pliable material of the collar-section 9 where it is secured upon the concave lower inner edge of the hame 5 conforms therewith, and is thus adapted to bear properly upon the breast and shoulders of the animal when in place thereon. The upper and lower edges of each pliable collar-section 9 converge somewhat toward the rear edge thereof, which is substantially parallel with the front edge that is attached to the hame.

A tug-strap 10 is preferably jointed at the forward end thereof upon the rear edge of a respective collar-section 9, said straps being each formed of a suitable number of plies of leather, and the rear end is loosely connected with a coupling-ring 10ᵃ for the attachment of a trace-chain or the like to the tug-strap.

The preferred means for jointing the forward end of each tug-strap 10 upon a respective collar-section 9 comprises the following details: A clamping-strip 11, of metal, flat in the body and having straight side edges, is placed in a fold $e$, formed in the material of the collar-section 9, across it at the rear edge, said fold or return bent portion being spaced from the outer surface of the collar-section with which it is integral.

A cap-plate 12 in the form of an elongated strip is seated upon the fold $e$ of each collar-section 9 and is thereto secured by rivets $g$, that are inserted through perforations in the clamping-strip 11 and also through alined perforations in the folded material and in the cap-plate.

A flattened arch $h$ is formed at or near the longitudinal center of each cap-plate 12, said arches projecting outwardly, and beneath each arch the material of the fold $e$ is cut loose at the side edges by transverse cuts therethrough, which releases it and permits the same to be extended flatwise from the rear edge of the collar-section to provide a protecting-flap $e'$ thereon.

Upon the forward end portion of each tug-strap 10 a joint-plate 13 is thereto secured and thence extended forwardly to loosely occupy the opening below each arched portion $h$ of the cap-plates 12. The portions of the joint-plates 13 that project into and through the openings afforded by the arches $h$ are pivoted upon the clamping-strip 11 and cap-plate 12, as at $i$, whereby the joint-plates are held to rock in a vertical plane upon the rear edges of the collar-sections 9 in a reliable manner, the pliability of the tug-straps 10 assuring easy lateral movement thereof while in use, the flaps $e'$ serving to prevent the joint-plates from contacting with the sides of the animal.

It will be seen that when the collar constructed as shown and described is placed upon a horse and the tug-straps are connected with a vehicle or other object to be drawn draft strain applied to the tug-straps 10 will be sustained by the collar-sections 9 and is by them distributed over the parts of the breast and shoulders of the animal with which said collar-sections have contact. From the manner of connecting the hames 5 with the front edges of the collar-sections 9 it will be seen that the hames may play vertically only on the bolt 7 and afford yielding support to the forward portions of the two-part collar-band in proper relation to the breast and shoulders of the animal and that the major portion of draft strain is sustained by the collar-sections 9.

The provision of the bolt connection at the upper ends of the hames, which permits the hames to be readily adjusted independently by pulling strain, so as to accommodate the collar to the motions of the animal, prevents chafing of the shoulders, the yoke-piece 8 by its engagement with the neck of the breast coacting with the hames and collar-sections to produce an even distribution of pulling strain over the breast and shoulders of the animal and enabling the animal to pull advantageously.

Having thus described my invention, I claim as new and desire to secure by Letters Patent—

The combination with a pair of hame-pieces, having adjustable connections between the upper and lower ends thereof, of a two-part pliable breast-collar secured at its forward edges to said pieces, and extended rearwardly to receive and distribute draft strain over the breast and shoulders of an animal, the inner edge of each of said parts being folded or turned over, a metal strip inserted beneath such fold, another metal strip applied to the outer side of the fold and formed with an outwardly-extending arch, the two said strips being united and secured to the breast-collar, and a tug-strap for each hame-piece, having at its forward end a plate pivoted within the arch of the corresponding outer strip.

In testimony whereof I have signed my name to this specification in the presence of two subscribing witnesses.

ROBERT J. HOTCHKISS.

Witnesses:
HENRY J. WILLIAMS,
FRANK ROBERTS.